United States Patent [19]

Smith

[11] Patent Number: 5,327,303
[45] Date of Patent: Jul. 5, 1994

[54] MR PREAMPLIFIER HAVING FEEDBACK LOOPS FOR MINIMIZING DIFFERENTIAL LOW FREQUENCY COMPONENTS AND REGULATING COMMON MODE LOW FREQUENCY COMPONENTS OF THE PREAMPLIFIER OUTPUT SIGNAL

[75] Inventor: Robert F. Smith, San Jose, Calif.

[73] Assignee: Seagate Technology, Inc., Scotts Valley, Calif.

[21] Appl. No.: 993,316

[22] Filed: Dec. 18, 1992

[51] Int. Cl.$^5$ .................. G11B 5/02; G11B 5/127; G11B 5/133

[52] U.S. Cl. .................. 360/67; 360/113

[58] Field of Search .............. 360/67, 113, 66, 60, 360/43, 68; 330/260; 324/117; 307/296 R; 328/167

[56] References Cited

U.S. PATENT DOCUMENTS

| | | | |
|---|---|---|---|
| 3,814,863 | 6/1974 | O'Day et al. | 360/113 |
| 4,040,113 | 8/1977 | Gorter | 360/113 |
| 4,191,977 | 3/1980 | Lewkowicz | 360/66 |
| 4,492,997 | 1/1985 | Arai et al. | 360/113 |
| 4,520,311 | 5/1985 | Petr et al. | 324/117 |
| 4,580,178 | 4/1986 | Wuori et al. | 360/67 |
| 4,706,138 | 11/1987 | Jove et al. | 360/67 |
| 4,712,144 | 12/1987 | Klaassen | 360/67 |
| 4,716,306 | 12/1987 | Sato et al. | 307/296 R |
| 4,743,861 | 5/1988 | Jove et al. | 330/260 |
| 4,786,993 | 11/1988 | Jove et al. | 360/67 |
| 4,833,559 | 5/1989 | Belk | 360/113 |
| 4,879,610 | 11/1989 | Jove et al. | 360/67 |
| 4,914,398 | 4/1990 | Jove et al. | 328/167 |
| 5,032,935 | 7/1991 | Jove et al. | 360/67 |
| 5,103,353 | 4/1992 | Jove et al. | 360/67 |
| 5,122,915 | 6/1992 | Klein et al. | 360/67 X |
| 5,229,894 | 7/1993 | Collins et al. | 360/43 |
| 5,235,472 | 8/1993 | Smith | 360/60 |

OTHER PUBLICATIONS

Magneto-Resistive Heads to Spur DCC, *Computer Technology Review*, vol. XII, No. 15, pp. 16, 21, Dec. 1992.

*Primary Examiner*—Donald Hajec
*Assistant Examiner*—Patrick Wamsley
*Attorney, Agent, or Firm*—Kinney & Lange

[57] ABSTRACT

A preamplifier circuit amplifies signals from a magneto-resistive element. The preamplifier circuit utilizes a voltage regulator to regulate one terminal of a magneto-resistive element at a predetermined voltage. A first feedback loop is used to minimize a differential DC component and a differential low frequency component of the differential output signal. A second feedback loop is utilized to cause a common mode component of the differential output signal to track an externally supplied reference voltage. The preamplifier of the present invention protects the magneto-resistive elements from short circuits of the disc medium, is powered by a single-ended power supply, and is capable of being coupled with other circuitry without physical coupling capacitors.

15 Claims, 6 Drawing Sheets

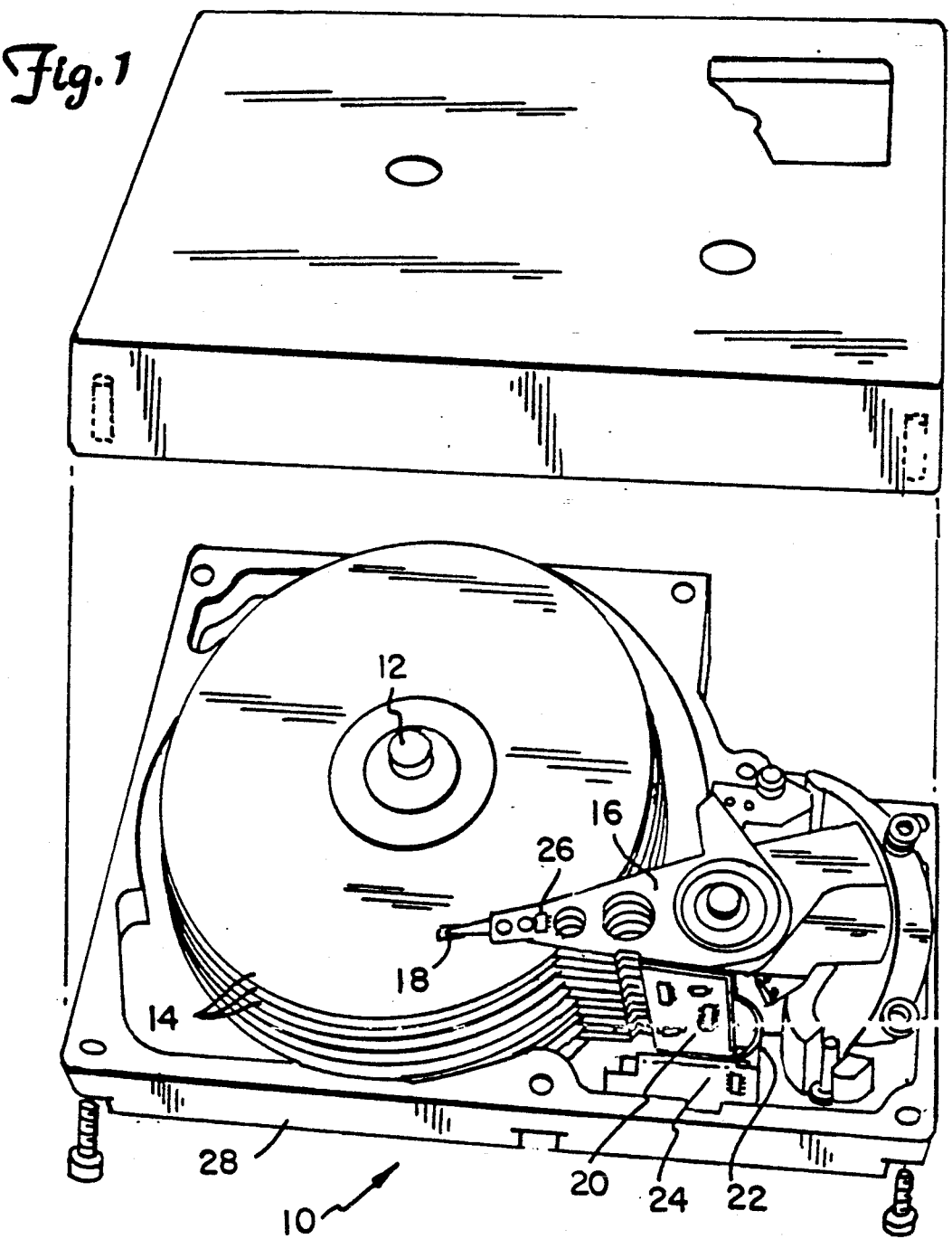

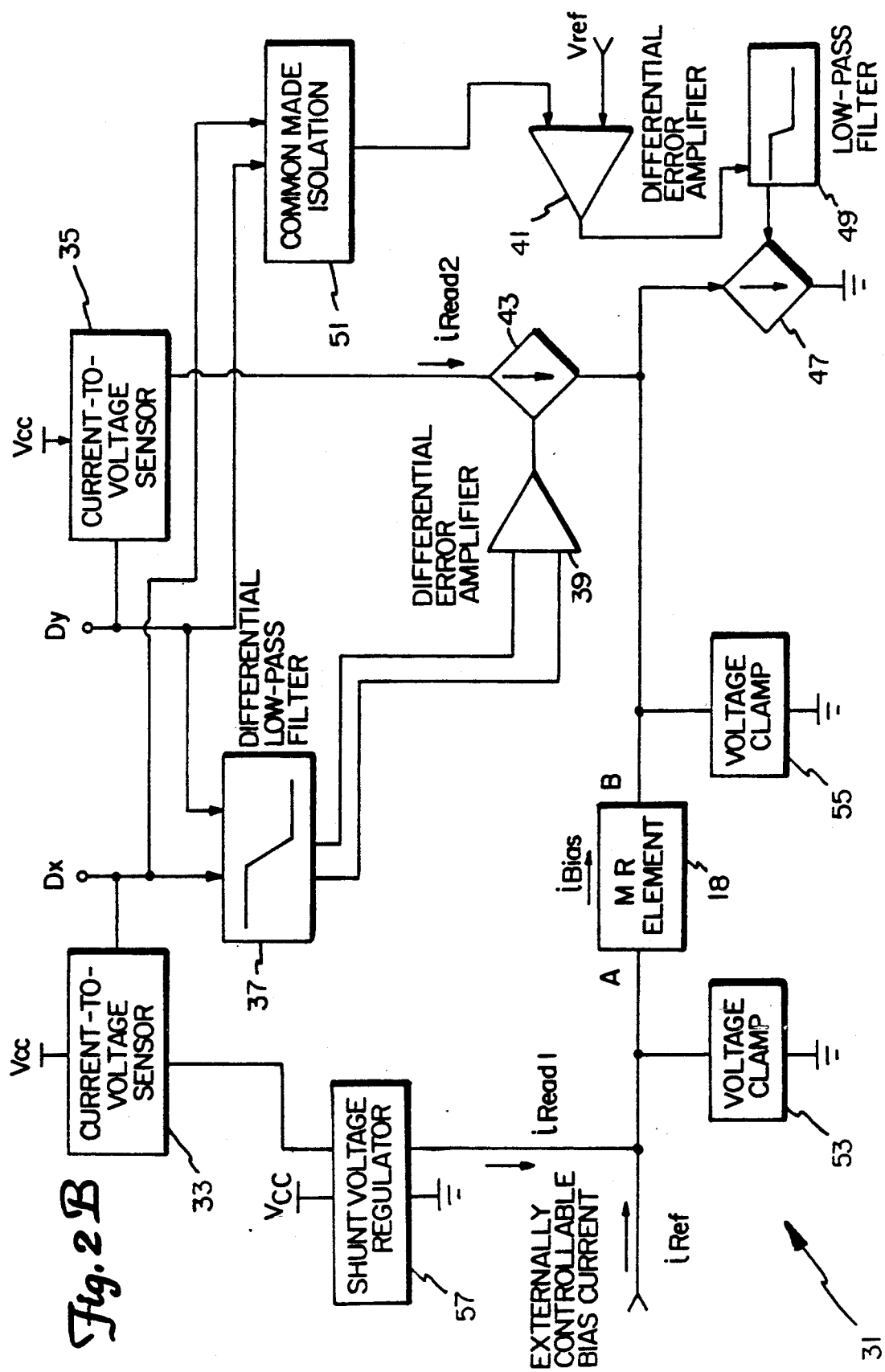

MR PREAMPLIFIER HAVING FEEDBACK LOOPS FOR MINIMIZING DIFFERENTIAL LOW FREQUENCY COMPONENTS AND REGULATING COMMON MODE LOW FREQUENCY COMPONENTS OF THE PREAMPLIFIER OUTPUT SIGNAL

BACKGROUND OF THE INVENTION

The present invention is a unipolar magneto-resistive preamplifier for use in a disc drive having a magneto-resistive element. Specifically, the preamplifier of the present invention utilizes a voltage regulator to maintain a voltage at one terminal of a magneto-resistive element, a first feedback loop to minimize a differential DC component and a differential low frequency component of the preamplifier output signal, and a second feedback loop to maintain a common mode component of the preamplifier output signals.

Magneto-resistive (MR) elements can read data from magnetic surfaces having data stored at high densities. In the disc drive art, MR elements are also referred to as MR heads or MR sensors. In addition, the term "magneto-restrictive" is sometimes used in place of the term "magneto-resistive."

The resistance of an MR element is, in part, a function of the strength of the magnetic field to which it is exposed. A read signal is generated by positioning the MR element proximate magnetic media, moving the magnetic media with respect to the element, and measuring the change in resistance of the element.

Typically, an MR element is biased by either a constant current or a constant voltage. As the magnetic flux passing through the element varies, a preamplifier detects the resistance changes of the MR element. In the constant current configuration, the change in voltage over the MR element is detected. In the constant voltage configuration, the change in current passing through the element is detected. The output of the preamplifier is then provided to other amplification and decoding circuitry for further processing.

Since the resistance of an MR element varies with magnetic field strength, the signal provided by the MR element is based not only on the data written on the magnetic media, but also on the distance between the element and the media. In addition, temperature and process variations also affect the steady-state resistance of an MR element. Accordingly, it is desirable to produce a preamplifier output signal that varies with changes in magnetic field strength, without varying significantly due to changes in steady-state resistance.

A preamplifier for producing such a signal was disclosed by Jove et al. in U.S. Pat. No. 4,706,138. Jove et al. disclosed a circuit wherein the amplified output signal represented the transient change in element resistance divided by the steady state resistance of the magnetic element, or alternatively, AR/R. The circuit disclosed by Jove et al. provided an improvement over the prior art because the output signal was not sensitive to resistance variations in individual MR elements and was not sensitive to the distance between the MR element and the surface of the magnetic media.

Another problem addressed in the prior art is protecting an MR element and a magnetic media surface from damage caused by a voltage discharge. Such a discharge can occur if a large enough voltage exists between the media surface and the element, and the two come sufficiently close to each other.

This problem is addressed by Jove et al., U.S. Pat. No. 4,879,610. In this patent, Jove et al. disclosed a protector circuit which maintains a fixed potential between the center of an MR element and an externally supplied reference voltage. A feedback loop employing a low pass filter is used to keep the voltage of the MR sensor at the same voltage as the externally applied reference voltage. The externally applied reference voltage is close to, if not the same as, the voltage at which the spindle and magnetic media are biased. In one embodiment, the spindle and media are connected to the disc drive's electrical ground, and the reference voltage is derived from a connection to the electrical ground. Accordingly, if the MR element should come into contact with the magnetic media, the voltage difference between the element and the media will be minimized and damage from a voltage discharge will be prevented.

One problem with the circuit disclosed by Jove et al., is that the circuit requires a two-sided power supply. In the preferred embodiment disclosed by Jove et al., the voltage of the MR element is maintained at the circuit ground potential (approximately zero volts), and a bias current is maintained through the MR element. Accordingly, one terminal of the MR element must be maintained above the ground voltage and the other terminal must be maintained below ground voltage. A two-sided power supply requires additional power, is more complex, and costs more than a single sided power supply.

Another technique used in the prior art to protect the magnetic surface and the MR element is to utilize a biased spindle configuration. In a biased spindle configuration, the rotating magnetic media is DC biased to some voltage away from the circuit common. Using this type of configuration, the protective circuit disclosed by Jove et al. can be operated with a single-sided power supply, with the spindle biased at a voltage level between the circuit Common and the supply voltage provided by the single-sided power supply. However, biasing the spindle at a voltage away from the circuit common is not desirable because the spindle must be electrically insulated from the rest of the drive to prevent a short-circuit.

Another problem which has proved challenging in the prior art is coupling the preamplifier output signal to other circuitry. Since the MR element must be DC biased, there is typically a DC bias in the output signal. Of course, a common method of removing a DC component from a signal is to use coupling capacitors. However, coupling capacitors are large and require significant space on a circuit board. In addition, disc drives often employ many MR elements and preamplifiers, and therefore require many coupling capacitors.

This problem was addressed by Belk in U.S. Pat. No. 4,833,559. Belk disclosed multiplexing plural MR elements into a single off chip capacitor. By multiplexing the MR elements, the number of capacitors required is minimized, and the component count is reduced. In addition, all the multiplexing transistors can be included on a single integrated circuit.

Another patent to Jove et al., U.S. Pat. No. 5,103,353, discloses an MR amplifier circuit having a first feedback loop which provides short circuit protection and a second feedback loop which minimizes the differential DC component in the output signal. The first feedback loop is similar to the feedback loop disclosed in U.S. Pat. No. 4,879,610. The second feedback loop equalizes the DC and low frequency components of two currents flowing through the collectors of two transistors. The output signal of the amplifier is derived from these two currents, and therefore, the differential DC and low frequency components of the output signal is minimized.

Although the differential DC and low frequency components are minimized, the common mode DC and low frequency components of the output signal are affected by the operation of the first feedback loop. Accordingly, coupling capacitors are still required to couple the amplifier output to other amplification circuitry that has an input stage with a different DC reference point. In addition, in a disc drive configuration not having a biased spindle, the preferred embodiment of this circuit requires a two-sided power supply to maintain the voltage of the MR element at the same voltage as the magnetic media.

SUMMARY OF THE INVENTION

The present invention is a unipolar magneto-resistive preamplifier circuit. The circuit is comprised of a voltage regulator which maintains the voltage of the magneto-resistive (MR) element with respect to a magnetic disc surface, a first feedback loop which eliminates differential DC and low frequency components from the differential output of the preamplifier, and a second feedback loop which causes a common mode DC and low frequency component of the output signal to equal an externally supplied reference voltage.

In one embodiment of the present invention, each of two terminals of the MR element are coupled to voltage clamps to ensure that the voltage difference between the MR element and the magnetic media does not exceed a specified value.

BRIEF DESCRIPTION OF THE DRAWINGS

FIG. 1 is an exploded perspective view of a disc drive which utilizes the unipolar magneto-resistive (MR) preamplifier of the present invention.

FIG. 2B is a block diagram showing an alternative embodiment of the unipolar MR preamplifier shown in FIG. 2A.

DETAILED DESCRIPTION OF THE PREFERRED EMBODIMENTS

Figure 2A:
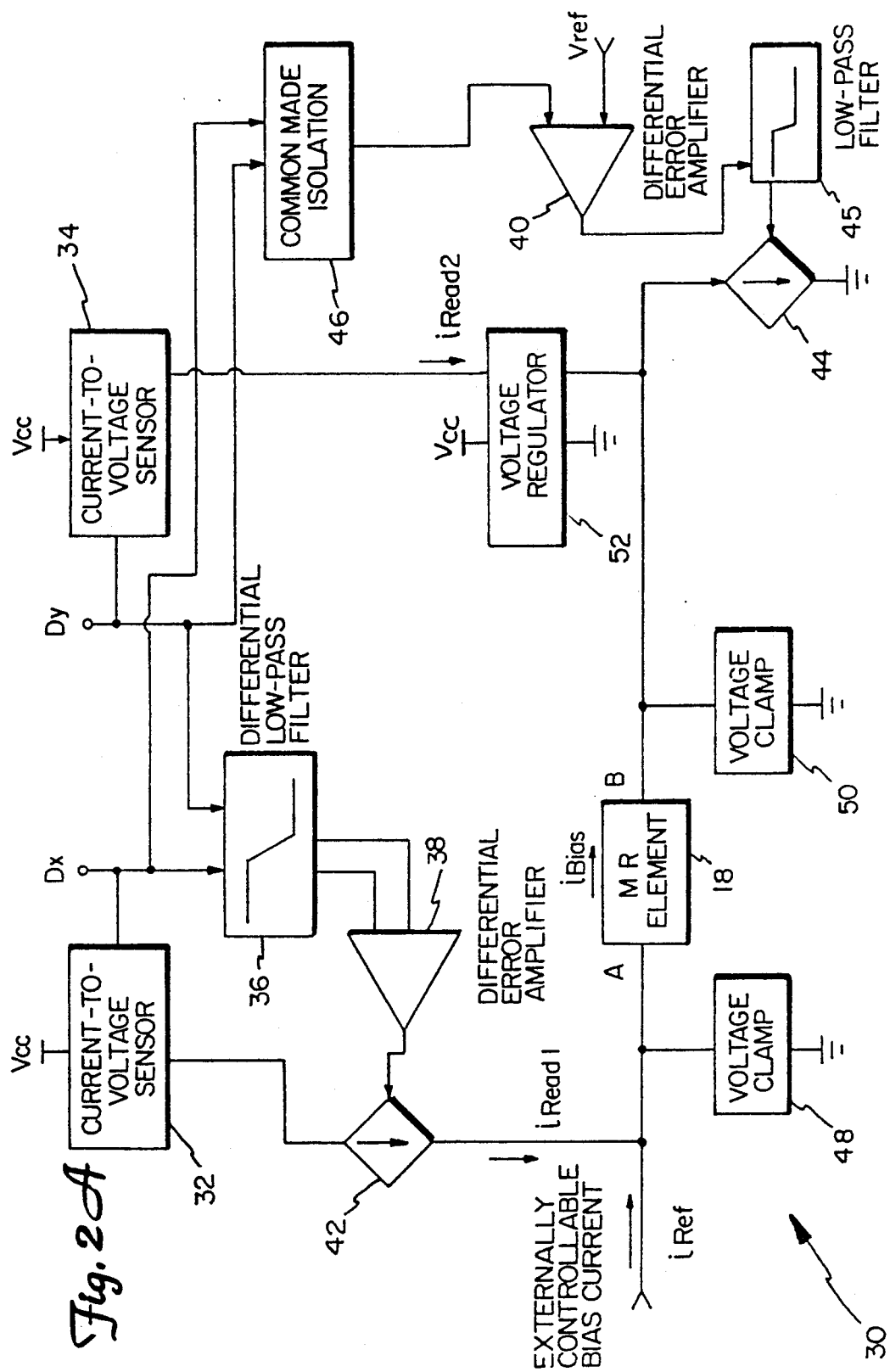
FIG. 2A is a block diagram showing the unipolar MR preamplifier that is utilized in the disc drive of FIG. 1.

FIG. 1 is an exploded perspective view showing a head/disk assembly (HDA) 10 which uses a preamplifier of the present invention. HDA 10 includes spindle 12, magnetic media discs 14, and actuator 16. Mounted on actuator 16 are MR elements 18 (one of which is shown in this Figure). Also mounted on actuator 16 is circuit board 20, which is connected by flexible circuit 22 to circuit board 24.

The preamplifier of the present invention produces an output signal which is provided to other circuitry for further processing. Ideally, the preamplifier should be mounted as close as possible to the MR element so that the preamplifier can receive a strong signal from the element. However for other reasons, such as cost, it may be desirable to mount the preamplifier elsewhere. Generally, the preamplifier will be mounted in one of three places. First, it may be bonded directly to actuator 16 in a position similar to location 26. Second, it may be positioned on circuit board 20, which is attached to actuator 16. Finally, it may be mounted to circuit 24, which is attached to base casting 28 of HDA 10.

FIG. 2A is a block diagram showing the magneto-resistive (MR) preamplifier circuit 30 of the present invention. Circuit 30 is comprised of current-to-voltage sensor blocks 32 and 34, differential low pass filter 36, differential error amplifiers 38 and 40, controllable current source 42, and controllable current sink 44, low pass filter 45, common mode isolation block 46, voltage clamps 48 and 50, and voltage regulator 52. Also shown in FIG. 2A is an MR element 18, which is also shown mounted on actuator 16 of FIG. 1. MR element 18 has a first terminal labeled "A" and a second terminal labeled "B."

In the embodiment shown in FIG. 1, spindle 12 and magnetic media discs 14 are electrically coupled via a resistance to the disc drive's common ground. This ground is represented by the ground symbols in FIG. 2A.

Voltage clamps 48 and 50 ensure that the voltage at either terminal of MR element 18 does not exceed a clamp voltage with respect to ground. In one embodiment, the clamp voltage is 0.7 volts. The clamp voltage of 0.7 volts, in combination with the current limiting resistance in series with the spindle motor, ensures that neither MR element 18 nor magnetic media 14 of FIG. 1 will be damaged by voltage discharge should the two come in contact with each other.

While circuit 30 is reading data, voltage regulator 52 regulates the voltage of terminal B of MR element 18 by modulating the current $I_{READ2}$. In one embodiment, voltage regulator 52 maintains terminal B of MR element 18 at a voltage of approximately 0.21 volts. Since a current $I_{BIAS}$ runs from terminal A, through MR element 18 to terminal B, the voltage at terminal A will be higher than the voltage at terminal B. However, voltage clamp 48 will ensure that the voltage at terminal A does not exceed the clamp voltage.

The current through MR element 18 is $I_{BIAS}$. $I_{BIAS}$ is comprised of the currents $I_{REF}$ and $I_{READ1}$. $I_{REF}$ is controlled by a signal generated external to circuit 30 and provides a DC component of $I_{BIAS}$ that is required to operate MR element 18 in a region where resistance changes can be detected. However, $I_{REF}$ does not provide the current which is used to detect resistance changes.

The other component of the current $I_{BIAS}$ is $I_{READ1}$. $I_{READ1}$ is provided by controllable current source 42 and is the current which is used to detect resistance changes in MR element 18. $I_{READ1}$ also passes through current-to-voltage sensor 32. Sensor 32 produces a voltage signal which varies with the magnitude of $I_{READ1}$. This voltage signal is coupled to terminal $D_X$. Terminal $D_X$ provides one-half of the differential output signal of preamplifier 30.

The other half of the output signal is found at terminal $D_Y$. The signal at terminal $D_Y$ is provided by current-to-voltage sensor 32. The current $I_{READ2}$ passes through sensor 32 and voltage regulator 52, and sensor 32 produces a voltage signal which varies with the magnitude of $I_{READ2}$.

Differential low pass filter 36 receives the voltage signals found at terminals $D_X$ and $D_Y$ and filters out the high frequency component of the differential signal. Accordingly, the differential output signal of filter 36 contains only the DC and low frequency components of the signal found at terminals $D_X$ and $D_Y$.

Differential error amplifier 38 receives the differential output signal of filter 36 and produces a control signal which is provided to controllable current source 42. Amplifier 38 controls current source 42 to minimize the DC and low frequency components of the differential output signal found at terminals $D_X$ and $D_Y$.

The differential signal at terminals $D_X$ and $D_Y$ is also supplied to common mode isolation block 46. Common mode isolation block 46 produces a signal representing the common component of the signals found at terminals $D_X$ and $D_Y$ with respect to ground.

Differential error amplifier 40 receives the signal produced by common mode isolation block 46 and compares it with an externally supplied voltage reference signal $V_{REF}$. In one embodiment, $V_{REF}$ is equal to the DC reference point of the input stage of the circuitry to which the differential output of circuit 30 is provided.

Differential error amplifier 40 compares the signal produced by common mode isolation block 46 to the signal $V_{REF}$. Differential error amplifier 40 then produces an error signal which is fed to low pass filter 45. Low pass filter 45 removes the high frequency component of the error signal produced by error amplifier 40, and produces a control signal which is provided to controlled current sink 44. The current flowing through current sink 44 is the sum of $I_{READ1}$, $I_{READ2}$, and $I_{REF}$.

FIG. 2B is a block diagram showing preamplifier circuit 31, which is an alternative embodiment of circuit 30 shown in FIG. 2A. Circuit 31 is comprised of current-to-voltage sensor blocks 33 and 35, differential low pass filter 37, differential error amplifiers 39 and 41, controllable current sources 43 and 47, low pass filter 49, common mode isolation block 51, voltage clamps 53 and 55, and voltage regulator 57. Also shown in FIG. 2B is an MR element 18.

Generally, the functional blocks in FIG. 2B perform the same functions as similarly named functional blocks in FIG. 2A. However, in FIG. 2B voltage regulator 57 modulates the current $I_{READ1}$, as opposed to $I_{READ2}$, to maintain a predetermined voltage at terminal A of MR element 18. Since the current $I_{BIAS}$ flows from terminal A to terminal B, the voltage at terminal A will be higher than the voltage at terminal B. Accordingly, voltage regulator 57 must maintain terminal A at higher voltage than the voltage maintained at terminal B by voltage regulator 52 of FIG. 2A. In one embodiment, regulator 57 maintains terminal A at approximately 0.4 volts.

Since voltage regulator 57 is controlling the current $I_{READ1}$, controlled current source 43 is controlling the current $I_{READ2}$. Source 43 is controlled by differential error amplifier 39, which in turn is provided with the differential output signal of differential low pass filter 37.

Each of the circuits shown in FIGS. 2A and 2B employ two feedback loops. In circuit 30 of FIG. 2A, the first loop controls $I_{READ1}$ to cause the DC and low frequency components of $I_{READ1}$ to equal the DC and low frequency components of $I_{READ2}$. The current $I_{READ2}$ is controlled to maintain terminal B at a predetermined voltage. The second feedback loop controls the sum of $I_{READ1}$ and $I_{READ2}$ so that the common mode voltage at $D_X$ and $D_Y$ equals the externally applied reference voltage $V_{REF}$. Likewise, in circuit 31 of FIG. 2B, the first loop controls $I_{READ2}$ to cause the DC and low frequency components of $I_{READ2}$ to equal the DC and low frequency components of $I_{READ1}$. The current $I_{READ1}$ is controlled to maintain terminal A at a predetermined voltage. The second feedback loop controls the sum of $I_{READ1}$ and $I_{READ2}$, so that the common mode voltage at $D_X$ and $D_Y$ equals the externally applied reference voltage $V_{REF}$.

These two feedback loops implement an electronic coupling capacitor. Since the common mode DC component of the signals found at $D_X$ and $D_Y$ is controlled to equal the common mode DC component of the inputs of the circuit to which $D_X$ and $D_Y$ are coupled, and the differential DC and low frequency components of the signals at $D_X$ and $D_Y$ are held at zero, no coupling capacitors are required to connect either circuit 30 or circuit 31 to another circuit. The "capacitance" of the electronic coupling capacitor is determined by the loop gains of the feedback loops and the locations of the poles of filters 36 and 45 in circuit 30, and filters 37 and 49 in circuit 31. Accordingly, both circuits minimizes the number of capacitors required to construct disc drive 10 of FIG. 1.

As previously discussed, the voltage clamps the voltage regulator protect MR element 18 from a voltage discharge to magnetic media. In addition, both circuit 30 and circuit 31 are designed to operate using a single-sided power supply in a non-biased spindle configuration, as will become apparent when discussing FIGS. 3A, 3B, and 3C.

Figure 3A:
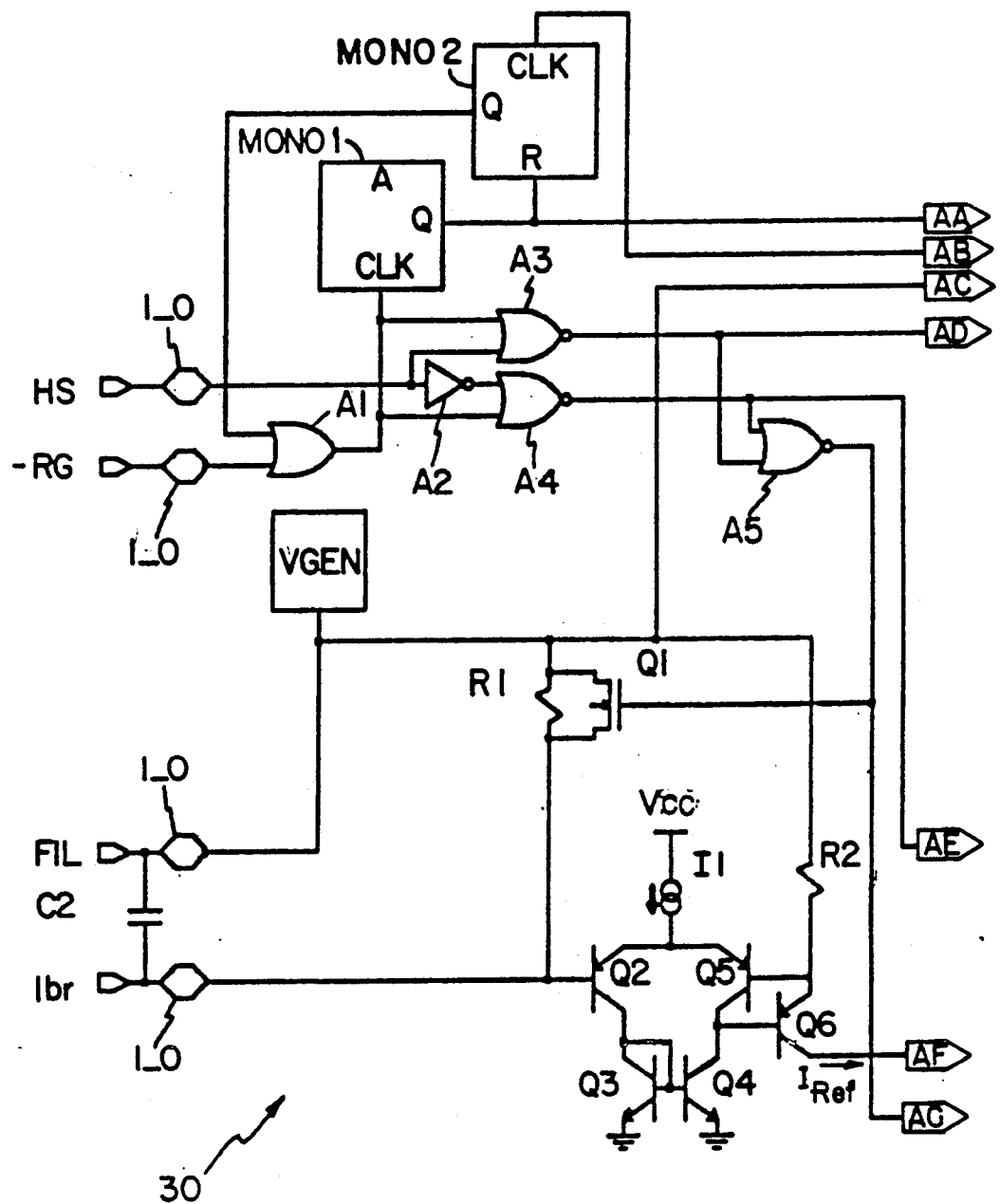
FIGS. 3A-3C are a transistor level diagram showing the unipolar MR preamplifier of FIG. 2A.
Figure 3B:
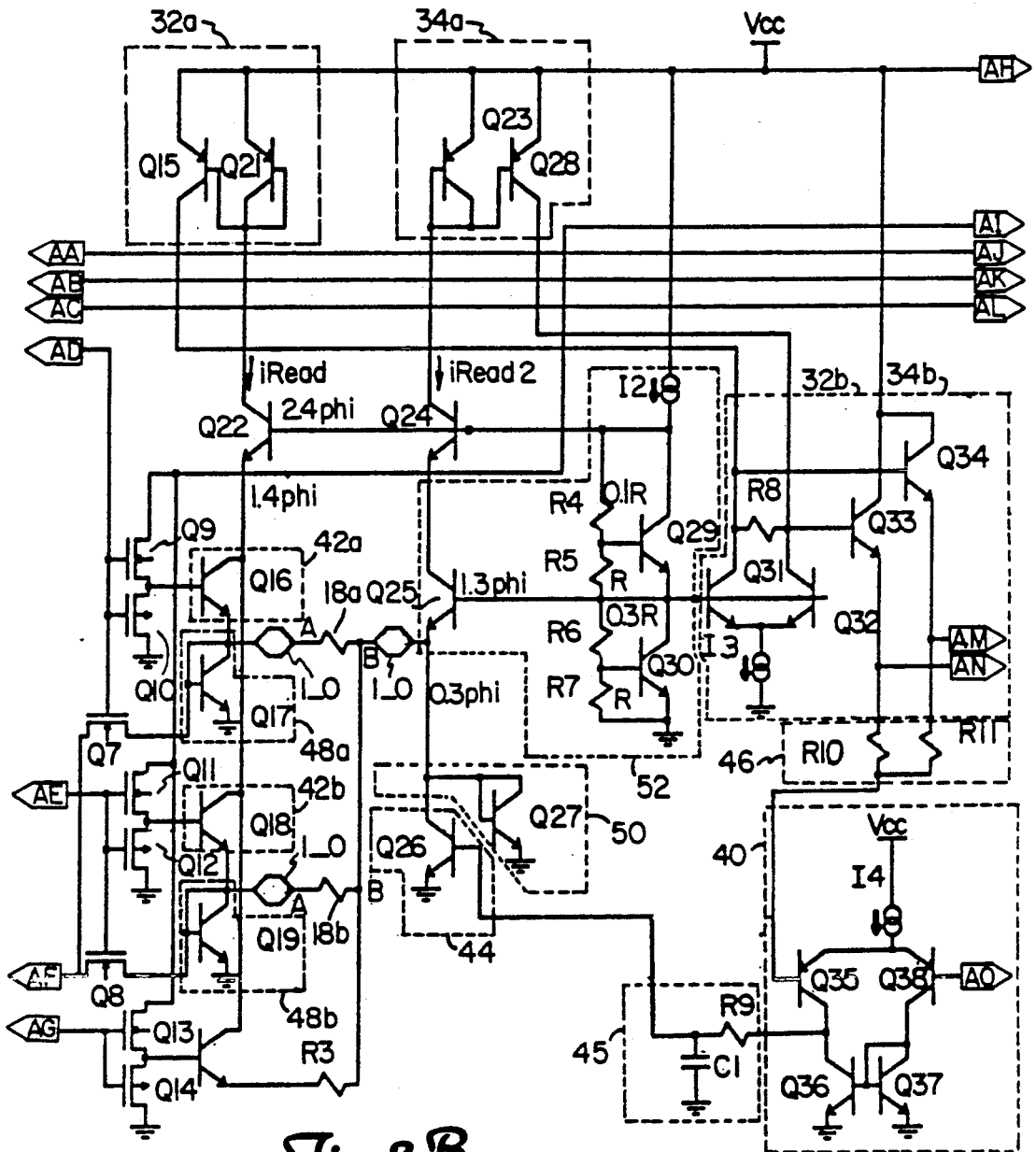
Figure 3C:
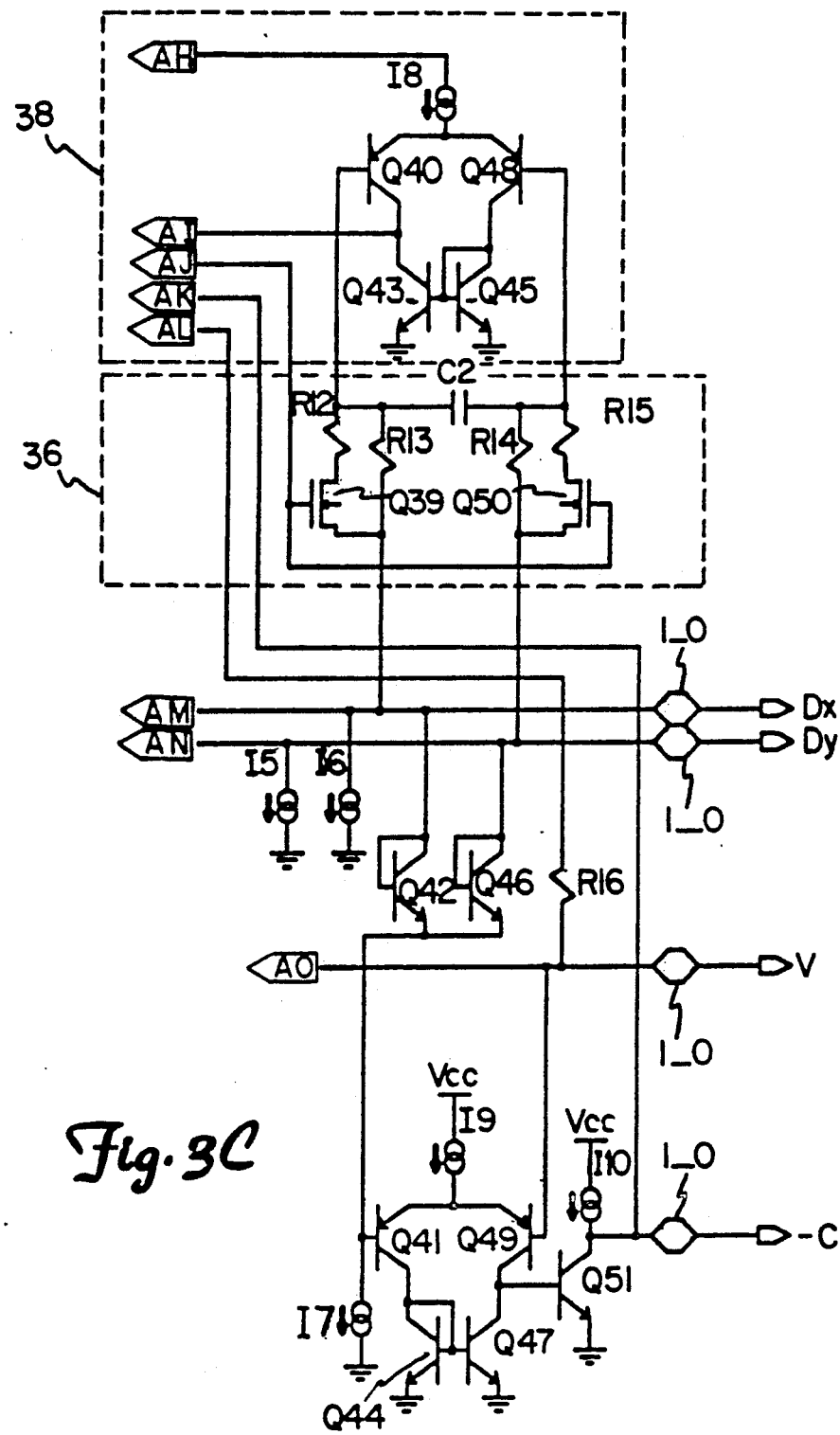

FIGS. 3A, 3B, and 3C together show a transistor level diagram of a preferred embodiment of preamplifier circuit 30 of FIG. 2A. To view the complete circuit, FIG. 3A should be positioned to the left of FIG. 3B, and FIG. 3C should be positioned to the right of FIG. 3B. Connections between the Figures are represented by connector symbols having alphabetic identifiers. Connections which supply external signals to circuit 30 are represented by connector symbols labeled "I_O."

In FIGS. 3A-3C, components which comprise the blocks shown in FIG. 2A are identified by dotted line boundaries and identical reference numbers. Current-to-voltage sensor blocks 32a-32b and 34a-34b, differential error amplifier 40, controllable current sources 42a and 42b, and controllable current sink 44, low pass filter 45, common mode isolation block 46, voltage clamps 48a, 48b, and 50, voltage regulator 52, and MR elements 18a and 18b are shown in FIG. 3B. Differential low pass filter 36 and differential error amplifier 38 shown in FIG. 3C.

Each MR element shown in FIG. 3B has a first terminal labeled "A" and a second terminal labeled "B." The embodiment of circuit 30 shown in FIGS. 3A-3C is capable of supporting two MR elements. The first MR element is labeled 18a and the second is labeled 18b. However, circuit 30 can be expended to support any number of MR elements. In the following discussion, the operation of circuit 30 will be explained primarily with reference to MR element 18a.

In FIGS. 3A-3C, the term "phi" is defined as being the voltage drop over a forward biased base-to-emitter junction of a transistor. Typically, phi will be equal to approximately 0.7 volts.

Voltage regulator 52 maintains the voltage of terminal B of MR element 18a at a voltage of 0.3 phi. Voltage regulator is comprised of transistors Q25, Q29, and Q30, resistors R4, R5, R6, and R7, and current source I2. Resistors R7 and R5 have a resistance of R, resistor R6 has a resistance of 0.3R, and resistor R4 has a resistance of 0.1R.

The base-to-emitter junction of transistor Q30 is forward biased. Accordingly, the base-to-emitter voltage drop is phi. Since the current through R7 is phi/R, and approximately the same current flows through R6, the voltage at the base of transistor Q25 is 1.3 phi. Transistor Q25 is also forward biased. Therefore, the voltage at the emitter of Q25 is 0.3 phi, or about 0.21 volts. The emitter of transistor Q25 is coupled to terminal B of MR element 18a, and during normal operation, maintains terminal B at a voltage of 0.3 phi.

Voltage clamp 48 of FIG. 2A is labeled 48a in FIG. 3B and is implemented by transistor Q17. The base and collector of Q17 are connected together and to terminal A of MR element 48a to form a clamp diode between ground and terminal A. Transistor Q19 implements voltage clamp 48 for terminal A of MR element 18b. Transistor Q19 is configured similarly to transistor Q17 and is labeled 48b. These two transistors prevent the terminals to which they are coupled from exceeding a voltage of phi.

Voltage clamp 50 is implemented by Q27. Q27 also has a common base-collector connection, which in turn is connected to the B terminals of each MR element. Transistor Q27 prevents the B terminals of each MR element from exceeding a voltage of phi. Transistors Q17, Q19, and Q27 prevent any part of the MR elements from exceeding a voltage of phi with respect to ground. Since spindle 12 and magnetic media discs 14 of FIG. 1 are electrically coupled to ground, transistors Q17, Q19, and Q27 prevent electrical discharge damage to the MR elements and the disc surfaces.

In FIG. 2A, the current flowing through MR element 18 is $I_{BIAS}$. $I_{BIAS}$ is the sum of the current $I_{READ1}$, which comes from controllable current source 42, and the current $I_{REF}$, which is controlled externally. In FIG. 3A, the control current $I_{BR}$ is externally supplied to circuit 30. The circuit comprised of resistors R1 and R2, transistors Q1, Q2, Q3, Q4, Q5, Q6, and current source I1 form a current multiplier. The current $I_{REF}$, therefore, is equal to the current $I_{BR}$ multiplied by the ratio of R1 divided by R2.

The current $I_{REF}$ is gated to MR element 18a by transistors Q7, then summed with the current $I_{READ1}$, which flows from the emitter of transistor Q16. Transistor Q16 implements controllable current source 42 of FIG. 2A for MR element 18a and is labeled 42a. Transistor Q18 implements controllable current source 42 for MR element 18b and is labeled 42b.

The current flowing through the collector of Q16 is buffered by Q22. The base of transistor Q22 is held at 2.4 phi through the action of transistor Q29 and resistors R4 and R5. After the base-to-emitter drop of Q22, the voltage at the collector is Q16 is 1.4 phi. Transistor Q21 mirrors the current flowing through the collector of transistor Q22 into the current flowing out of collector Q15. Transistors Q22 and Q15 perform part of the functions represented by current-to-voltage sensor 32 in FIG. 2A and are labeled 32a.

By analogy, the emitter of transistor Q25 supplies the current labeled $I_{READ2}$. This current is buffered by Q24 and is mirrored by transistor Q23 into the collector of transistor Q28. Transistors Q23 and Q28 perform part of the functions represented by current-to-voltage sensor 34 in FIG. 2A and are labeled 34a.

The remainder of the functions provided by current-to-voltage sensors 32 and 34 are performed by the components within the dotted line boundary labeled 32b. This box is also labeled 34b to correspond with FIG. 2A. These components are resistor RS, transistors Q31, Q32, Q33, and Q34, and current source I3.

The currents found at the collectors of transistors Q15 and Q28 are transformed into voltages by the output impedances of transistors Q31 and Q32 in parallel with RS. The currents flowing through the emitters of Q31 and Q32 equal the current sourced by current source I3. The voltages found at the collectors of transistors Q31 and Q32 are buffered by transistors Q34 and Q33, respectfully. The emitter of transistor Q34 supplies the output terminal $D_X$ with one half of the differential output signal and the emitter of transistor Q33 supplies terminal $D_Y$ with the other half of the differential voltage output signal. Current sources I5 and I6 provide a current sink for the currents at the emitters of transistors Q33 and Q34, respectively, and help regulate the voltages at terminals $D_X$ and $D_Y$.

The differential output signal found at the terminals $D_X$ and $D_Y$ is fed to differential low pass filter 36. In FIG. 3C, differential low pass filter 36 is implemented by capacitor C2, resistors R12, R13, R14, and R15, and transistors Q39 and Q50. Transistors Q39 and Q50 are included to change the poles of differential filter 36 in certain situations, which will be described below.

The output of differential low pass filter 36 is provided to differential error amplifier 38. In FIG. 3C, differential error amplifier 38 is implemented by current source I8, and transistors Q40, Q43, Q45, and Q48. Error amplifier 38 compares the two differential components of the output of differential low pass filter 36 and produces a control signal at the collectors of Q40 and Q43, which are coupled together. The control signal is fed through transistor Q9 and into the base of transistor Q16.

Resistors R10 and R11 of FIG. 3B together form common mode isolation block 46. These resistors produce a common mode average signal of the two differential output signals $D_X$ and $D_Y$. This common mode signal is applied to the base of Q35.

Differential error amplifier 40 compares the output of common mode isolation block 46 with an externally supplied reference voltage $V_{REF}$. In the preferred embodiment shown in FIG. 3B, differential error amplifier 40 is implemented by current source I4 and transistors Q35, Q36, Q37, and Q38. The output of differential error amplifier 40 is an error current and is found at the collectors of Q35 and Q36, which are coupled together.

The error current produced by error amplifier 40 is applied to resistor R9. Resistor R9 and capacitor C1 form low pass filter 45. The error current is integrated by capacitor C1, forming a voltage which is applied to the base of transistor Q26.

Transistor Q26 implements controllable current sink 44 and controls the common mode component of the output signal at terminals $D_X$ and $D_Y$. Q26 receives the voltage from low pass filter 45 and regulates the current flowing through Q26. The current flowing through Q26 is the sum of the currents $I_{READ1}$, $I_{READ2}$, and $I_{REF}$.

Since the voltage at the collector of transistor Q26 is held to 0.3 phi, or about 0.21 volts, Q26 is operating in the boundary area between the saturation and active modes. In this boundary area, Q26 is actually acting more like a field effect transistor, wherein the voltage over capacitor C1 controls the current through transistor Q26.

It is important that transistor Q26 function as a controlled current source with such a small collector-to-emitter voltage. In order for circuit 30 to operate correctly using a single-sided power supply in a disc drive having a non-biased spindle configuration, the collector voltage of Q30 must be low enough so that electrical discharge damage will not occur if the MR element comes in contact with the magnetic media.

Two other signals which are supplied externally to circuit 30 are HS and −RG. These signals and the functions activated by them are not shown in FIG. 2A. The signal HS is the MR element select signal and is an acronym for the term "head select." The signal −RG determines whether circuit 30 will read data and is an acronym for the term "read gate". When −RG is low, circuit 30 is reading. When −RG is high, circuit 30 is not reading data and disc drive 10 is performing some other operation.

The circuitry responsible for processing the signals HS and −RG is shown in FIGS. 3A and 3B and includes monostable multivibrators MONO1 and MONO2, OR gate A1, NOR gates A3, A4, and A5, invertor A2, and transistors Q1, Q7, QS, Q9, Q10, Q11, Q12, Q13, and Q14. In addition, circuit 30 includes a comparator circuit which provides a signal in the event of contact between an MR element and the surface of magnetic disc 14 of FIG. 1. The comparator circuit is shown in FIG. 3C and includes current sources I7, I9, and I10 and transistors Q41, Q44, Q47 and Q49.

Monostable multivibrators MONO1 and MONO2 are activated by high-to-low transitions at their respective CLK inputs. When a multivibrator is activated, its Q output will become and remain high for a predetermined time period. The R input, which is only utilized by MONO2 will force the Q output low before the preselected time period has expired.

Assume that −RG has been high for a sufficiently long period of time. The Q outputs of both MONO1 and MONO2 will be low. The output of OR gate A1 will be high, which in turn will drive the outputs of NOR gates A3 and A4 low. When −RG is high, signal HS is prevented from affecting the outputs of NOR gates A3 and A4.

Since the output of NOR gate A3 is low, transistors Q9 and Q7 are off and transistor Q10 is on. This prevents the currents $I_{READ1}$ and $I_{REF}$ from entering terminal A of MR element 18a. Since the output of NOR gate A4 is also low, MR element 18b is similarly affected. Q11 and Q8 are off and Q12 is on.

The outputs of NOR gates A3 and A4 are also provided to NOR gate A5, driving the output of NOR gate A5 high. When the output of NOR gate A5 is high, transistors Q1 and Q13 are on and transistor Q14 is off. When transistor Q1 is on, the resistance encountered by the current which otherwise would run through resistor R1 is close to zero. Since the current $I_{REF}$ is equal to the externally supplied current $I_{BR}$ multiplied by the ratio of R1 divided by R2, current $I_{REF}$ is zero when transistor Q1 is on. In addition, the current $I_{READ1}$ is routed through transistor Q13 and resistor R3. The resistance of R3 is chosen such the current $I_{READ1}$ will produce a voltage drop over R3 that approximates the voltage drop across a typical MR element having a current flow equal to $I_{BIAS}$. By routing $I_{READ1}$ through R3 when circuit 30 is inactive, the critical components stay active and can respond quickly when −RG becomes low.

Now assume that −RG becomes low. The output of OR gate A1 will become low, which will activate MONO1 and set its Q output high for a predetermined time period. When the Q output of MONO1 becomes high, transistors Q39 and Q50 of differential low pass filter 36 are turned on and will remain on until the Q output goes low. This will increase the bandwidth of filter 36 by increasing the frequency of the pole location in the amplifier transfer function. By increasing the bandwidth of filter 36, the recovery time required by filter 36 after a high-to-low transition of the −RG signal is reduced.

After the predetermined time period, the Q output of MONO1 returns to low and circuit 30 is in read mode. In read mode, the HS signal determines which MR element is active. If HS is high, the output of NOR gate A3 will be low, with transistors Q9 and Q7 off and transistor Q10 on, and the output of NOR gate A4 will be high, with transistors Q11 and Q8 on and transistor Q12 off. Accordingly, MR element 18b will be active and MR element 18a will be inactive. When HS is low, the output of NOR gate A3 will be high, with transistors Q9 and Q7 on and transistor Q10 off, and the output of NOR gate A4 will be low, with transitors Q11 and Q8 off and transistor Q12 on. Accordingly, MR element 18a will be active and MR element 18b will be inactive.

In the event of contact between a surface of magnetic disc 14 and an MR element, the currents through both Q16 and Q25 will increase as current flows from the MR element through magnetic discs 14 to the ground of disc drive 10. When the currents through both of these transistors increase, it will be reflected in current-to-voltage sensors 32a–32b and 34a–34b. Accordingly, the common mode voltage of the output signals found at terminals $D_X$ and $D_Y$ will increase. When the common mode voltage increases, additional current will flow through transistors Q42 and Q46, which will result in an increase in voltage at the base of transistor Q41.

The voltage at the base of transistor Q41 is compared to the voltage at the base of transistor Q49, which is the externally supplied reference voltage $V_{REF}$. If the voltage at the base of Q41 is greater than $V_{REF}$, the signal −C will go low, indicating that the MR element has come into contact with a surface of magnetic disc 14. When −C goes low, it activates monostable multivibrator MONO2 and the Q output of MONO2 goes high. This has the same effect on circuit 30 as changing the state of −RG from low to high. Accordingly, circuit 30 enters a standby mode wherein the current $I_{REF}$ is turned off and the current $I_{READ1}$ is routed through resistor R3.

After a predetermined period of time, the Q output of MONO2 will return low and normal operation will resume if the MR element is no longer in contact with a surface of disc 14. If the MR element is still in contact, then −C will go low again and activate another standby cycle.

Another signal which is provided external to circuit 30 allows the reference voltage provided by VGEN to be filtered. This signal is labeled FIL and would be coupled to an external capacitor in an assembled disc drive 10.

The unipolar MR preamplifier of the present invention operates with a single-ended power supply, eliminates damage caused by voltage discharge, and eliminates the need for coupling capacitors between the output of the preamplifier and the input stage of other circuitry.

In the prior art, preamplifiers prevented voltage discharge either by using a two-sided power supply or by biasing the spindle. In the present invention, a voltage regulator maintains a minimal voltage difference between the MR element and the disc surface. The difference is small enough to prevent voltage discharge without requiring a biased spindle. In addition, since the preamplifier of the present invention uses a transistor operating near saturation to control the common mode component of the differential output signal, the preamplifier can be powered by a single-sided power supply.

In the prior art, a first feedback loop was used to minimize the differential DC and low frequency component of the preamplifier output signal while a second feedback loop was used to regulate the voltage of the MR element to prevent damage from voltage discharge. The second loop also affected the DC common mode component of the differential output signal. Accordingly, coupling capacitors were required to remove the DC common mode component.

In the present invention, protection from voltage discharge is provided by a voltage regulator. Therefore, a second feedback loop is available to control the common mode DC and low frequency components of the output signal. By having a first feedback loop eliminate the differential DC and low frequency components, while a second feedback loop regulates the common mode DC and low frequency components, the output signal of the preamplifier of the present invention implements an electronic coupling capacitor. The capacitance of the electronic coupling capacitor is altered when the preamplifier of the present invention is placed in read mode, thereby reducing the settling time of the circuit.

Since the preamplifier of the present invention implements an electronic coupling capacitor, there is no need to use physical capacitors to connect the preamplifier to other circuitry. This reduces the component count, thereby reducing the cost of a disc drive constructed with the preamplifier of the present invention.

Although the present invention has been described with reference to preferred embodiments, workers skilled in the art will recognize that changes may be made in form and detail without departing from the spirit and scope of the invention.

What is claimed is:

1. A preamplifier for use with a magneto-resistive element, the preamplifier comprising:
   a first MR terminal for coupling the preamplifier to a first terminal of the magneto-resistive element;
   a second MR terminal for coupling the preamplifier to a second terminal of the magneto-resistive element;
   a first preamplifier output terminal;
   second preamplifier output terminal, wherein a differential output signal is provided at the first and second preamplifier output terminals;
   a controlled current source having a current output coupled to the first MR terminal and a first control input which controls a magnitude of current provided at the current output;
   first output means for producing a first output signal that provides an indication of the magnitude of current provided at the current output, the first output signal coupled to the first preamplifier output terminal;
   a controlled current sink having a current input coupled to the second MR terminal, and a second control input which controls the magnitude of current consumed at the current input;
   second output means for providing a conduction path from a voltage supply to the second MR terminal and for producing a second output signal that is coupled to the second preamplifier output terminal, the second output signal providing an indication of a magnitude of current flowing though the conduction path;
   means for producing a first error control signal based on differential DC and low frequency components of the differential output signal, the first error control signal coupled to the first control input of the controlled current source; and
   means for producing a second error control signal based on common mode DC and low frequency components of the differential output signal and a reference voltage signal, wherein the second error control signal is coupled to the controlled current sink.

2. The preamplifier of claim 1 and further comprising:
   a voltage regulator coupled to the second MR terminal.

3. The preamplifier of claim 1 and further comprising:
   a reference current source having an independently controllable reference current output coupled to the first MR terminal.

4. The preamplifier of claim 1 and further comprising:
   first clamping means coupled to the first MR terminal, for preventing the first MR terminal from exceeding a predetermined voltage; and
   second clamping means coupled to the second MR terminal, for preventing the second MR terminal from exceeding a predetermined voltage.

5. A preamplifier and biasing circuit for producing at first and second output terminals a differential output signal derived from a magneto-resistive element that is coupled to the preamplifier at first and second element terminals, protecting the magneto-resistive element from voltage discharge between the magneto-resistive element and magnetic media, and coupling the first and second output terminals to other circuitry without physical coupling capacitors, wherein the preamplifier circuit is powered by a single ended power supply, the preamplifier circuit comprising:
   means for producing a first read signal that is applied to the magneto-resistive element;
   means for producing a second read signal;
   means for deriving a first output signal from the first read signal;
   means for deriving a second output signal from the second read signal, wherein the first and second output signals together form the differential output signal;
   a first feedback loop that adjusts a magnitude of the first read signal based on the differential output signal, to cause differential DC and low frequency components of the first output signal to equal differential DC and low frequency components of the second output signal; and
   a second feedback loop that adjusts a magnitude of a sum of the first and second read signals based on the differential output signal, to cause common mode DC and low frequency components of the differential output signal to equal a reference voltage.

6. The preamplifier of claim 5 and further comprising:
   means for maintaining the second element terminal at a predetermined voltage with respect to a voltage of the magnetic media.

7. The preamplifier of claim 5 and further comprising:
   first clamping means coupled to the first element terminal, for preventing the first element terminal from exceeding a predetermined voltage with respect to a voltage of the magnetic media; and second clamping means coupled to a second element terminal, for preventing the second element terminal of the magneto-resistive element from exceeding a predetermined voltage with respect to the voltage of the magnetic media.

8. In combination:
a disc drive base;
a spindle rotatably coupled to the disc drive base;
a disc mounted to the spindle, the disc having a magnetic media surface that is maintained at a media voltage;
an actuator arm movably coupled to the disc drive base;
a magneto-resistive element mounted to the actuator arm and proximate the magnetic media surface of the disc, the magneto-resistive element having first and second element terminals; and
a preamplifier for producing at first and second output terminals a differential output signal derived from the magneto-resistive element, the preamplifier comprising:
means for producing a first read signal that is applied to the magneto-resistive element;
means for producing a second read signal;
means for deriving a first output signal from the first read signal;
means for deriving a second output signal from the second read signal, wherein the first and second output signals together form the differential output signal;
a first feedback loop that adjusts a magnitude of the first read signal based on the differential output signal, to cause differential DC and low frequency components of the first output signal to equal differential DC and low frequency components of the second output signal; and
a second feedback loop that adjusts a magnitude of a sum of the first and second read signals based on the differential output signal, to cause common mode DC and low frequency components of the differential output signal to equal a reference voltage.

9. The combination of claim 8 wherein the preamplifier further comprises:
means for maintaining the second element terminal at a predetermined voltage with respect to the media voltage.

10. The combination of claim 8 wherein the preamplifier further comprises:
first clamping means coupled to the first element terminal, for preventing the first element terminal from exceeding a predetermined voltage with respect to the media voltage; and
second clamping means coupled to a second element terminal, for preventing the second element terminal for the magneto-resistive element from exceeding a predetermined voltage with respect to the media voltage.

11. In combination:
a magneto-resistive element having first and second element terminals; and
a preamplifier for producing at first and second output terminals a differential output signal derived from the magneto-resistive element, the preamplifier comprising:
means for producing a first read signal that is applied to the magneto-resistive element;
means for producing a second read signal;
means for deriving a first output signal from the second read signal;
means for deriving a second output signal from the second read signal, wherein the first and second output signals together form the differential output signal;
a first feedback loop that adjusts a magnitude of the first read signal based on the differential output signal, to cause differential DC and low frequency components of the first output signal to equal differential DC and low frequency components of the second output signal; and
a second feedback loop that adjusts a magnitude of a sum of the first and second read signals based on the differential output signal, to cause common mode DC and low frequency components of the differential output signal to equal a reference voltage.

12. A preamplifier for use with a magneto-resistive element, the preamplifier comprising:
a first MR terminal for coupling the preamplifier to a first terminal of the magneto-resistive element;
a second MR terminal for coupling the preamplifier to a second terminal of the magneto-resistive element;
a first preamplifier output terminal;
a second preamplifier output terminal, wherein a differential output signal is provided at the first and second preamplifier output terminals;
a controlled current source having a current output coupled to the second MR terminal and a first control input which controls a magnitude of current provided at the current output;
first output means for producing a first output signal that provides an indication of the magnitude of current provided at the current output, the first output signal coupled to the first preamplifier output terminal;
a controlled current sink having a current input coupled to the second MR terminal, and a second control input which controls the magnitude of current consumed at the current input;
second output means for providing a conduction path from a voltage supply to the first MR terminal and for producing a second output signal that is coupled to the second preamplifier output terminal, the second output signal providing an indication of a magnitude of current flowing though the conduction path;
means for producing a first error control signal based on differential DC and low frequency components of the differential output signal, the first error control signal coupled to the first control input of the controlled current source; and
means for producing a second error control signal based on common mode DC and low frequency components of the differential output signal and a reference voltage signal, wherein the second error control signal is coupled to the controlled current sink.

13. The preamplifier of claim 12 and further comprising:
a voltage regulator coupled to the first MR terminal.

14. The preamplifier of claim 12 and further comprising:
a reference current source having an independently controllable reference current output coupled to the first MR terminal.

15. The preamplifier of claim 12 and further comprising:

first clamping means coupled to the first MR terminal, for preventing the first MR terminal from exceeding a predetermined voltage; and second clamping means coupled to the second MR terminal, for preventing the second MR terminal from exceeding a predetermined voltage.

* * * * *

UNITED STATES PATENT AND TRADEMARK OFFICE
CERTIFICATE OF CORRECTION

PATENT NO. : 5,327,303
DATED : July 5, 1994
INVENTOR(S) : Robert F. Smith

Page 1 of 2

It is certified that error appears in the above-indentified patent and that said Letters Patent is hereby corrected as shown below:

Col. 1, line 59, delete "AR/R.", insert --$\Delta$R/R.--
Col. 2, line 39, delete "Common", insert --common--
Col. 4, line 58, delete "sensor 32", insert --sensor 34--

Col. 6, line 2, delete commas

UNITED STATES PATENT AND TRADEMARK OFFICE
CERTIFICATE OF CORRECTION

PATENT NO. : 5,327,303
DATED : July 5, 1994
INVENTOR(S) : Robert F. Smith

It is certified that error appears in the above-indentified patent and that said Letters Patent is hereby corrected as shown below:

Col. 7, line 31, delete "$I_{READD1}$,", insert --$I_{READ1}$--

Col. 7, line 41, delete "$I_{REAAD1}$,", insert --$I_{READ1}$--

Col. 7, line 67, delete "RS", insert --R8--

Col. 8, line 4, delete "RS", insert --R8--

Col. 8, line 56, delete "$I_{REAAD2}$,", insert --$I_{READ2}$--

Col. 9, line 18, delete "QS", insert --Q8--

Col. 9, line 43, delete "Q11", insert --Q11--

Col. 10, line 12, delete "Q11, insert --Q11--

Col. 11, line 48, before "second", insert --a--

Col. 13, line 56, delete "for", insert --of--

Col. 14, line 2, delete "second", insert --first--

Signed and Sealed this

Thirteenth Day of December, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,327,303
DATED : July 5, 1994
INVENTOR(S) : Robert F. Smith

It is certified that error appears in the above-indentified patent and that said Letters Patent is hereby corrected as shown below:

Col. 1, line 59, delete "AR/R.", insert --$\Delta R/R$--

Col. 2, line 39, delete "Common", insert --common--

Col. 4, line 58, delete "sensor 32", insert --sensor 34--

Col. 4, line 59, delete "sensor 32", insert --sensor 34--

Col. 4, lines 59-60, delete "sensor 32", insert --sensor 34--

Col. 6, line 2, delete commas

Col. 6, line 52, delete "expended", insert --expanded--

Col. 7, line 31, delete "$I_{READD1}$,", insert --$I_{READ1}$,--

Col. 7, lines 41, delete "$I_{READD1}$,", insert --$I_{READ1}$,--

Col. 7, line 67, delete "RS", insert --R8--

Col. 8, line 4, delete "RS", insert --R8--

Col. 8, line 56, delete "$I_{READD2}$,", insert --$I_{READ2}$,--

Col. 9, line 18, delete "QS", insert --Q8--

Col. 9, line 43, delete "Qll", insert --Q11--

UNITED STATES PATENT AND TRADEMARK OFFICE
CERTIFICATE OF CORRECTION

PATENT NO. : 5,327,303
DATED : July 5, 1994
INVENTOR(S) : Robert F. Smith

It is certified that error appears in the above-indentified patent and that said Letters Patent is hereby corrected as shown below:

Col. 10, line 12, delete "Qll", insert --Q11--

Col. 11, line 48, before "second", insert --a--

Col. 13, line 2, delete "second", insert --first--

Col. 14, line 2, delete "second", insert --first--

Col. 14, line 48, delete "though", insert --through--

This certificate supersedes Certificate of Correction issued December 13, 1994.

Signed and Sealed this

Twenty-ninth Day of August, 1995

Attest:

BRUCE LEHMAN

Attesting Officer     Commissioner of Patents and Trademarks